United States Patent [19]

Sato et al.

[11] Patent Number: 4,691,005
[45] Date of Patent: Sep. 1, 1987

[54] THIOPHENE DERIVATIVE POLYMER, POLYMER COMPOSITION, AND METHODS FOR MANUFACTURE THEREOF

[75] Inventors: Masaaki Sato; Susumu Tanaka, both of Ibaraki; Kyoji Kaeriyama, Tsuchiura; Yoshio Suda, Hachioji, all of Japan

[73] Assignee: Agency of Industrial Science & Technology, Ministry of International Trade & Industry, Tokyo, Japan

[21] Appl. No.: 831,494

[22] Filed: Feb. 21, 1986

[30] Foreign Application Priority Data

Mar. 9, 1985 [JP] Japan .................................. 60-46816
Mar. 9, 1985 [JP] Japan .................................. 60-46818

[51] Int. Cl.⁴ .......................................... C08G 75/00
[52] U.S. Cl. .................................. 528/380; 204/59 R; 252/500; 252/518; 524/80; 524/401; 524/404; 524/411; 524/412; 524/415; 528/490; 528/491; 528/492; 549/59
[58] Field of Search .............. 252/500, 518; 204/597; 524/80, 401, 404, 411, 412, 415; 528/490, 491, 492; 549/59; 528/380

[56] References Cited

U.S. PATENT DOCUMENTS 4,501,686  2/1985  Hotta et al. .................. 252/500
4,521,589  6/1985  Yamamoto et al. ............ 528/380
4,582,578  4/1986  Hotta et al. .................. 204/59 R

OTHER PUBLICATIONS

Thackeray et al., J. Phys. Chem., 89(1985), pp. 5133-5140.
Afanas'ev et al., Chem. Abst., 94(1981), #4306t.
Sato et al., J. Chem. Soc.; Chem. Commun., 1985, pp. 713-714.
Die Makromolekulare Chemie-Macromolecular Chemistry and Physics, 185, No. 7, "Electrochemical Preparation and Characterization of Poly(2,5-Thiophenediyl)", S. Tanaka et al., pp. 1295-1306, Jul. 1984.
Synthetic Metals, vol. 6, No. 4, Nov. 1983, S. Hotta et al., "Electrochemical Preparation of a Poly(3-Methylthienylene) Film", pp. 317-318.
Synthetic Metals, vol. 9, No. 3, Jun. 1984, S. Hotta et al., "Electrochemically Prepared Poly(3-Methylthienylene) Films Doped with Iodine", pp. 381-387.
Journal of the Chemical Society, Chemical Communications, Royal Society of Chemistry, No. 7, Apr. 1, 1983, K. Kaneto et al., "Electrochemical Preparation of a Metallic Polythiophene Film", pp. 382-383.

Primary Examiner—Arthur P. Demers
Attorney, Agent, or Firm—Oblon, Fisher, Spivak, McClelland & Maier

[57] ABSTRACT

A polymer composition having poly-[2,5-(3-ethylthienylene)] doped with an anion is obtained by electrochemically polymerizing 3-ethylthiophene in an anion-containing salt as an electrolyte. Poly-[2,5-(3-ethylthienylene)] is obtained by electrochemically reducing the polymer composition thereby removing the anion therefrom. The aforementioned polymer composition and poly-[2,5-(3-ethylthienylene)] are novel substances.

1 Claim, 1 Drawing Figure

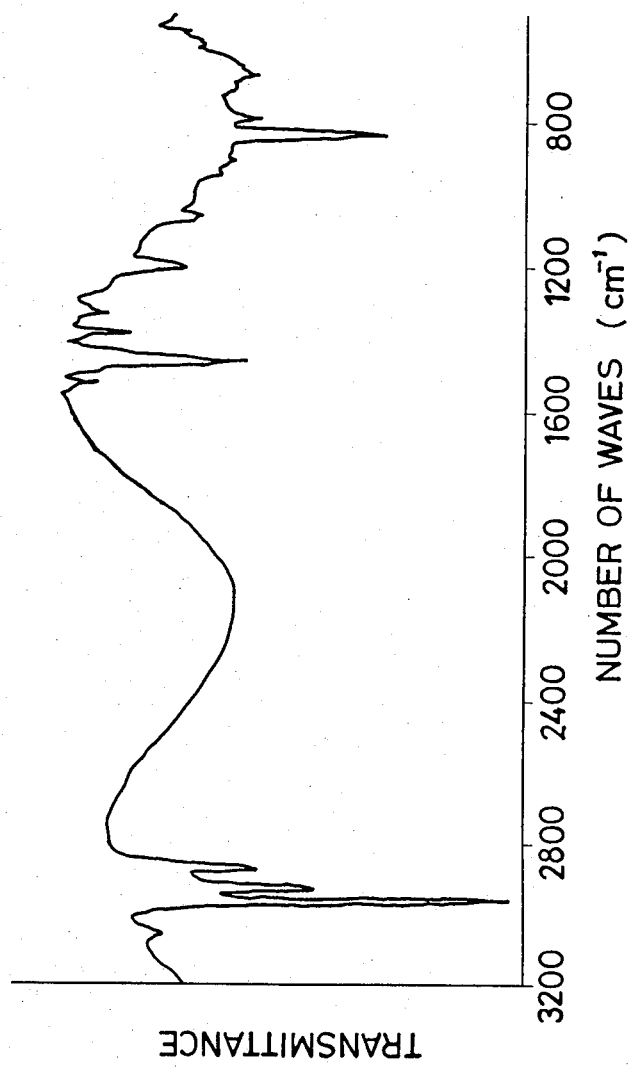

THIOPHENE DERIVATIVE POLYMER, POLYMER COMPOSITION, AND METHODS FOR MANUFACTURE THEREOF

FIELD OF THE INVENTION AND RELATED ART STATEMENT

This invention relates to a novel thiophene derivative polymer and an electrically conductive polymer composition produced by doping the polymer with an anion, which are both useful for electronic devices and high molecular materials, and to methods for the manufacture of the polymer and the polymer composition.

As polymers of thiophene and thiophene derivatives, poly-(2,5-thienylene) obtained by electrochemically polymerizing thiophene and subsequently electrochemically reducing the resultant polymer (Makromol. Chem., Vol. 185, page 1295 (1984)) and poly-[2,5-(3-methylthienylene)] obtained by electrochemically polymerizing 3-methylthiophene and subsequently electrochemically reducing the resultant polymer [Synth. Met., Vol. 9, page 381 (1984)] have been known to the art.

Poly-(2,5-thienylene) and poly-[2,5-(3-methylthienylene)] are red. As described above, such polymer is intended for electronic devices and high molecular materials and, therefore, is required to have a color other than red. The polymer and the polymer composition satisfy this requirement. Further, the polymer of this invention has its electrical conductivity enhanced by being doped with an anion as described fully afterward. In contrast, the aforementioned two conventional polymers, in a doped state, exhibit electrical conductivity not exceeding 120 S/cm.

As polymer compositions of thiophene derivatives, a polymer composition obtained by electrochemically polymerizing thiophene ["J.C.S. Chem. Commun.," page 382 (1983)] and a polymer composition obtained by electrochemically polymerizing 3-methylthiophene ["Synth. Met.," Vol. 6, page 317 (1983)] have been known to the art.

Unfortunately, the polymer compositions of thiophene and 3-methylthiophene have electrical conductivity of not more than 120 S/cm.

OBJECT AND SUMMARY OF THE INVENTION

An object of this invention is to provide a novel thiophene derivative polymer such that the film of the polymer assumes a color other than the red color held to be peculiar to the conventional thiophene polymer or its derivative polymer and the polymer in a doped state, i.e., the polymer composition possesses sufficiently high electrical conductivity for practical applications of the composition.

Through a study for accomplishing the object described above, the inventors have found that poly-[2,5-(3-ethylthienylene)], although a polymer of a thiophene derivative, has a color other than red, that a polymer composition obtained by doping the polymer with an anion possesses highly electrical conductivity, that the electrically conductive polymer composition having poly[2,5-(3-ethylthienylene)] doped with an anion is produced by electrochemically polymerizing 3-ethylthiophene in an electrolyte containing the anion with which the doping is effected, and that the poly-[2,5-(3-ethylthieneylene)] is produced by electrochemically reducing the electrically conductive polymer composition produced in consequence of the aforementioned electrochemical polymerization.

BRIEF DESCRIPTION OF THE DRAWING

The drawing is an infrared absorption spectrum of poly-[2,5-(3-ethylthieneylene)] produced in Example 2. In the diagram, transmittance is represented on the ordinate and the number of waves on the abscissa.

DETAILED DESCRIPTION OF THE PREFERRED EMBODIMENTS

The polymer of the present invention is a novel substance not reported so far in the literature. It is an electrical insulator having a transmitting light of orange color. Further, the polymer composition doped with such an anion as hexafluorophosphate ion, hexafluoroarsenate ion, tetrafluoroborate ion, perchlorate ion, or trifluoromethanesulfonate ion is also a novel substance note yet reported in the literature. It is an electrical conductor possessing electrical conductivity of 150 to 270 S/cm and having a blue transmitting light.

As described above, the polymer of the present invention is a poly-[2,5-(3-ethylthienylene)], which is specifically represented by the following general formula:

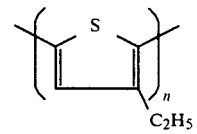

wherein n stands for a number of at least about 90 and not more than about 250.

The infrared absorption spectrum of this polymer shows an absorption ascribable to a 2,3,5-tri-substituted thiophene ring at a wave number of 830 cm$^{-1}$ and an absorption ascribable to an apparently terminal 2,3-di-substituted-thiophene at a wave number of 700 cm$^{-1}$. Further in the visible and ultraviolet absorption spectrum of the polymer, a maximum absorption appears at 2.7 eV. These data show that the polymer possesses a long conjugated part. The polymer of this invention can be identified based on these data. The nature of the polymer of this invention will be specifically described below.

(1) It possesses a transmitting light of orange color.
(2) It is electrically an insulator. Its electric conductivity is not more than about $10^{-8}$ S/cm ($10^{-8}$ to $10^{-15}$).
(3) In the form of a film, it possesses gloss.
(4) The polymer film obtained in a thickness of not more than 1 μm on the electrode is oxidized and consequently doped when it is exposed to a potential of about 0.45 V against a silver-silver ion reference electrode in an acetonitrile solution of 0.1M of tetraethylammonium hexafluorophosphate (Et$_4$NPF$_6$). The oxidized polymer film can be reduced and deprived of the dopant when it is exposed to a potential of about 0.5 V. The oxidation and reduction can be alternately repeated. This fact means that the change of color (orange←→blue) can be repeated. The polymer composition produced by doping the polymer with an anion contains the anion roughly in the range of 0.15 to 0.50 per monomer unit.

As described above, this polymer composition is electrically a conductor in the form of a film possessing electrical conductivity of 150 to 270 S/cm and having a blue transmitting light.

Now, the methods for the manufacture of the polymer composition and the polymer of the present invention will be described.

First, a polymer composition having poly-[2,5-(3-ethylthienylene)] doped with an anion is obtained by electrolyzing a reaction solution containing 3-ethylthiophene, a supporting electrolyte, and a solvent such as propylene carbonate thereby electrochemically polymerizing 3-ethylthiophene.

The above mentioned supporting electrolyte is at least one selected from the group consisting of hexafluorophosphate ion, hexafluoroarsenate ion, tetrafluoroborate ion, perchlorate ion, and trifluoromethane sulfonate ion, and is contained in the reaction solution in the form of salt.

The composition of the electrolyte has only to permit electrochemical polymerization and electrochemical reduction. A typical composition desirable for practical purposes is shown below by way of illustration. The electrolyte contains 0.01 to 0.2 mole of an anion-containing salt and 0.1 to 0.3 mole of 3-ethylthiophene per liter of propylene carbonate.

The electrode may be made of such a noble metal as gold or platinum, nickel, or carbon. Otherwise a glass electrode produced by depositing indium oxide and tin, or stannic oxide and antimony on a glass substrate may be used. The cathode to be used may be formed of aluminum or mercury.

The electrochemical polymerization may be effected by any of the known methods such as constant-current electrolysis, constant-voltage electrolysis, and constant-potential electrolysis. The electrochemical polymerization is advantageously carried out under an inactive atmosphere such as of nitrogen or argon. The polymer composition film can have its thickness adjusted by the duration of passage of electric current. The polymer composition is obtained in a form doped with the anion contained in the supporting electrolyte. This polymer composition is then electrochemically reduced to expel the anion and produce poly-[2,5-(3-ethylthienylene)]. This polymer is insoluble in organic solvents and excellent in chemical stability.

Now, the present invention will be described specifically below with reference to working examples.

EXAMPLE 1

A solution was prepared by dissolving 0.224 g (2 millimoles) of 3-ethylthiophene in 10 ml of propylene carbonate and adding 0.083 g (0.3 millimole) of tetraethylammonium hexafluorophosphate to the resultant solution. For the electrolysis, an ITO glass electrode was used as an anode and a platinum plate as a cathode. The solution was blown with argon for 15 minutes and then electrochemically polymerized at 5° C. When the polymerization effected with a current density of 10 mA/cm$^2$ was continued for 1.33 minutes, a black membranous polymer composition of the present invention having poly[2,5-(3-ethylthienylene)] doped with hexafluorophosphate ion was formed on the anode.

The composition had a thickness of 2.0 μm and electrical conductivity of 270 S/cm.

EXAMPLE 2

After the completion of the same procedure as in Example 1, electrochemical reduction was carried out by reversing the electrodes in polarity and continuing the flow of current at a density of 0.5 mA/cm$^2$ until the voltage between the electrodes reached about 20 V. The product on the anode was separated from the anode, washed with acetonitrile, and dried. Consequently, there was obtained a membranous polymer of orange color. It was identified as a poly-[2,5-(3-ethylthienylene)] of a polymerization degree, n, of about 170. The infrared absorption spectrum of this polymer is shown in the drawing. It had a thickness of 1.7 μm and electrical conductivity of not more than 10$^{-8}$ S/cm.

EXAMPLE 3

The same electrochemical polymerization as in Example 1 was carried out for four minutes with a current density of 10 mA/cm$^2$. Consequently, there was obtained a black membranous polymer composition doped with hexafluorophosphate ion. This polymer composition had a thickness of 6.3 μm and electrical conductivity of 240 S/cm.

EXAMPLE 4

Electrochemical polymerization was carried out with a current density of 5 mA/cm$^2$ for 8 minutes by following the procedure of Example 1, except that 0.064 g (0.3 millimole) of sodium hexafluoroarsenate was used in the place of tetraethylammonium hexafluorophosphate and an aluminum plate was used as a cathode. Consequently, there was obtained a black membranous polymer composition doped with hexafluoroarsenate ion. This polymer composition had a thickness of 7.1 μm and electrical conductivity of 270 S/cm.

EXAMPLE 5

Electrochemical polymerization was carried out with a current density of 10 mA/cm$^2$ for 3 minutes by following the procedure of Example 1, except that 0.065 g of (0.3 millimole) of tetraethylammonium tetrafluoroborate was used in the place of tetraethylammonium hexafluorophosphate. Consequently, there was obtained a black membranous polymer doped with tetrafluoroborate ion. This polymer composition had a thickness of 5.3 μm and electrical conductivity of 190 S/cm.

EXAMPLE 6

After the completion of the same procedure as in Example 5, electrochemical reduction was carried out by reversing the electrodes in polarity and continuing the flow of current at a density of 0.5 mA/cm$^2$ until the voltage between the electrodes reached about 20 V. The product formed on the anode was separated from the anode, washed with acetonitrile, and dried to produce a membranous polymer of orange color. It was identified as a poly-[2,5-(3-ethylthienylene)] of a polymerization degree, n, of about 110. The infrared absorption spectrum of this polymer was substantially identical to that shown in the drawing.

This polymer had a thickness of 4.9 μm and electrical conductivity of not more than 10$^{-8}$ S/cm.

EXAMPLE 7

Electrochemical polymerization was carried out with a current density of 10 mA/cm$^2$ for 4 minutes by following the procedure of Example 1, except that 0.118 g (0.3 millimole) of tetrabutylammonium trifluoromethane sulfonate was used in the place of tetraethylammonium hexafluorophosphate. Consequently, there was obtained a black membranous polymer doped with trifluoromethane sulfonate ion. This polymer composition had a thickness of 6.8 μm and electrical conductivity of 250 S/cm.
What is claimed is:
1. A poly-[2,5-(ethylthienylene)] having a trtansmitting light of orange color represented by the formula:
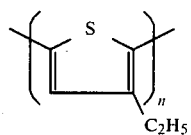
wherein n denotes a number of at least 110 and not more than 250.
* * * * *